United States Patent
Sorvari

(10) Patent No.: US 6,640,918 B2
(45) Date of Patent: Nov. 4, 2003

(54) HOOD MOUNTING SYSTEM FOR MOBILE VEHICLE

(75) Inventor: Paul N. Sorvari, Fort Wayne, IN (US)

(73) Assignee: International Truck Intellectual Property Company, LLC., Warrenville, IL (US)

( * ) Notice: Subject to any disclaimer, the term of this patent is extended or adjusted under 35 U.S.C. 154(b) by 68 days.

(21) Appl. No.: 10/078,795

(22) Filed: Feb. 19, 2002

(65) Prior Publication Data

US 2003/0155162 A1 Aug. 21, 2003

(51) Int. Cl.[7] .................................................. B62D 25/12
(52) U.S. Cl. ...................... 180/69.22; 280/781; 296/194
(58) Field of Search ............................. 180/69.2, 69.21, 180/69.22, 89.12, 89.13, 89.14, 89.16, 89.17, 89.18, 89.19, 69.23; 280/781; 296/135, 207, 24.1, 35.1, 190.01, 190.06, 76, 183, 192, 194, 203.02

(56) References Cited

U.S. PATENT DOCUMENTS

| | | | | |
|---|---|---|---|---|
| 2,502,622 A | * | 4/1950 | Harris | 180/89.14 |
| 4,141,427 A | * | 2/1979 | Kirchweger et al. | 180/69.22 |
| 4,210,362 A | * | 7/1980 | Boersma | 296/190.07 |
| 4,220,217 A | * | 9/1980 | Kobayashi | 180/328 |
| 4,222,451 A | * | 9/1980 | Lamb | 180/89.13 |
| 4,413,695 A | * | 11/1983 | Slocombe et al. | 180/89.14 |
| 4,413,696 A | * | 11/1983 | Slocombe et al. | 180/89.14 |
| 4,427,090 A | * | 1/1984 | Fredriksen et al. | 180/327 |
| 4,436,169 A | * | 3/1984 | Jennerjohn et al. | 180/89.14 |
| 4,451,079 A | * | 5/1984 | Takahashi | 296/190.07 |
| 5,101,921 A | * | 4/1992 | West et al. | 180/69.21 |
| 5,261,721 A | * | 11/1993 | Conger et al. | 296/146.15 |
| 5,551,826 A | * | 9/1996 | Todd et al. | 414/685 |
| 5,890,556 A | * | 4/1999 | Shearn et al. | 180/69.21 |
| 5,975,228 A | * | 11/1999 | Parfitt | 180/69.21 |
| 6,374,936 B1 | * | 4/2002 | Smith | 180/89.17 |
| 6,540,287 B2 | * | 4/2003 | Luik et al. | 296/214 |

* cited by examiner

Primary Examiner—Brian L. Johnson
Assistant Examiner—Bridget Avery
(74) Attorney, Agent, or Firm—Jeffrey P. Calfa; Neil T. Powell; Dennis Kelly Sullivan

(57) ABSTRACT

A hood mounting system and a mobile vehicle with this system installed provides improved sound dampening for the hood of the vehicle. The hood mounting system includes two lower hood brackets and one upper cowl guide mounted to the cowl or forward portion of the cab of the vehicle. The hood of the mounting system includes a rear support frame that has a center hood guide bracket for engagement to the upper cowl guide. The hood rear support frame also has two hood rear support guides, one each vertical side of the support frame. Each hood rear support guide mates with a lower hood bracket. The lower hood brackets each contain a liner insert that may be made from a rubber or urethane sheet or molded from this material. This liner insert acts as the component interface. The center guide bracket of the hood also has a urethane or rubber liner insert located within its fold receptacle. The guide components may each have urethane insert pad for mating with the urethane or rubber liner of the associated mating components. The insert-pad-to-liner of the associated components provide increased noise reduction and manufacturing play in regards to mating tolerances.

15 Claims, 3 Drawing Sheets

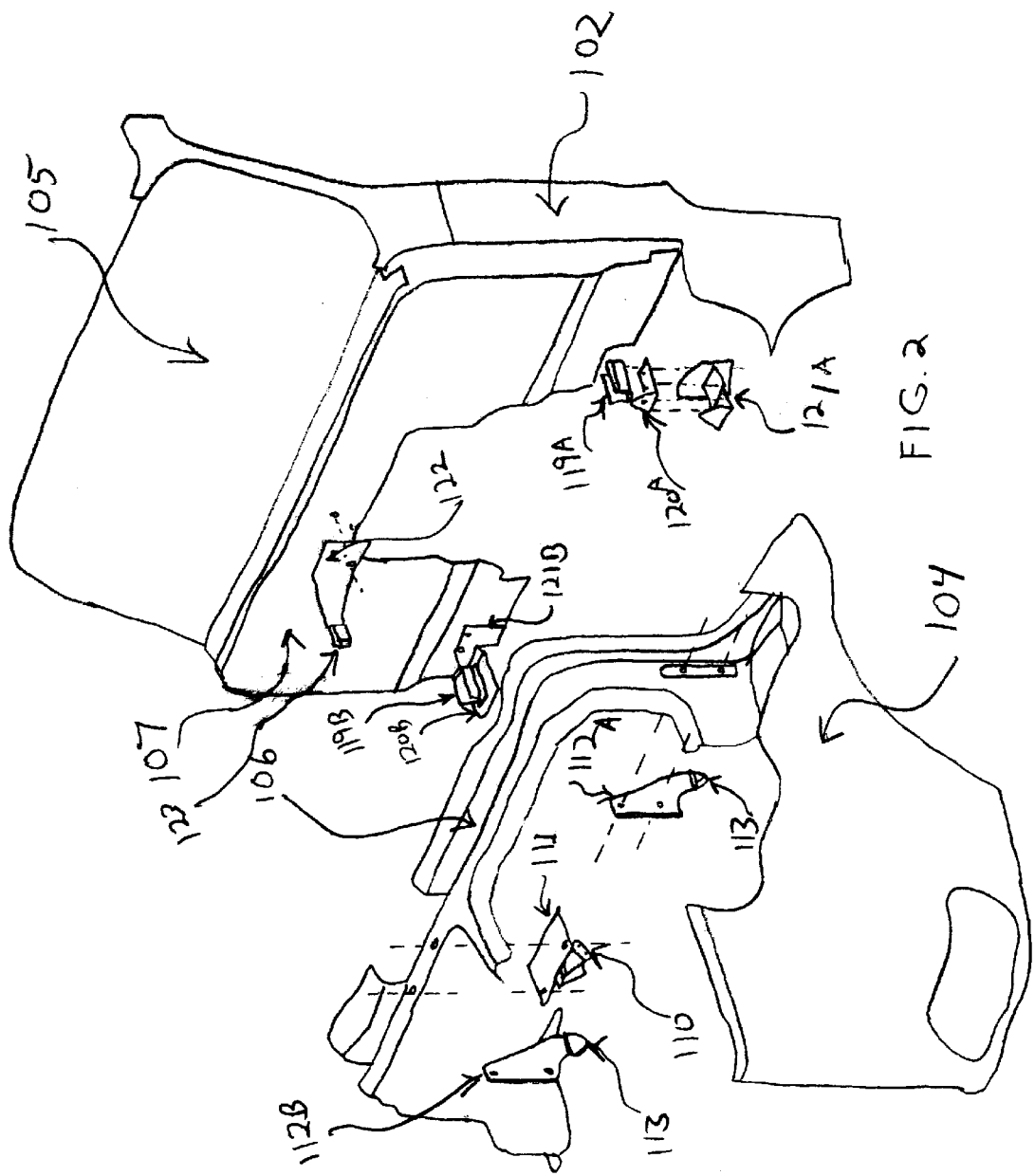

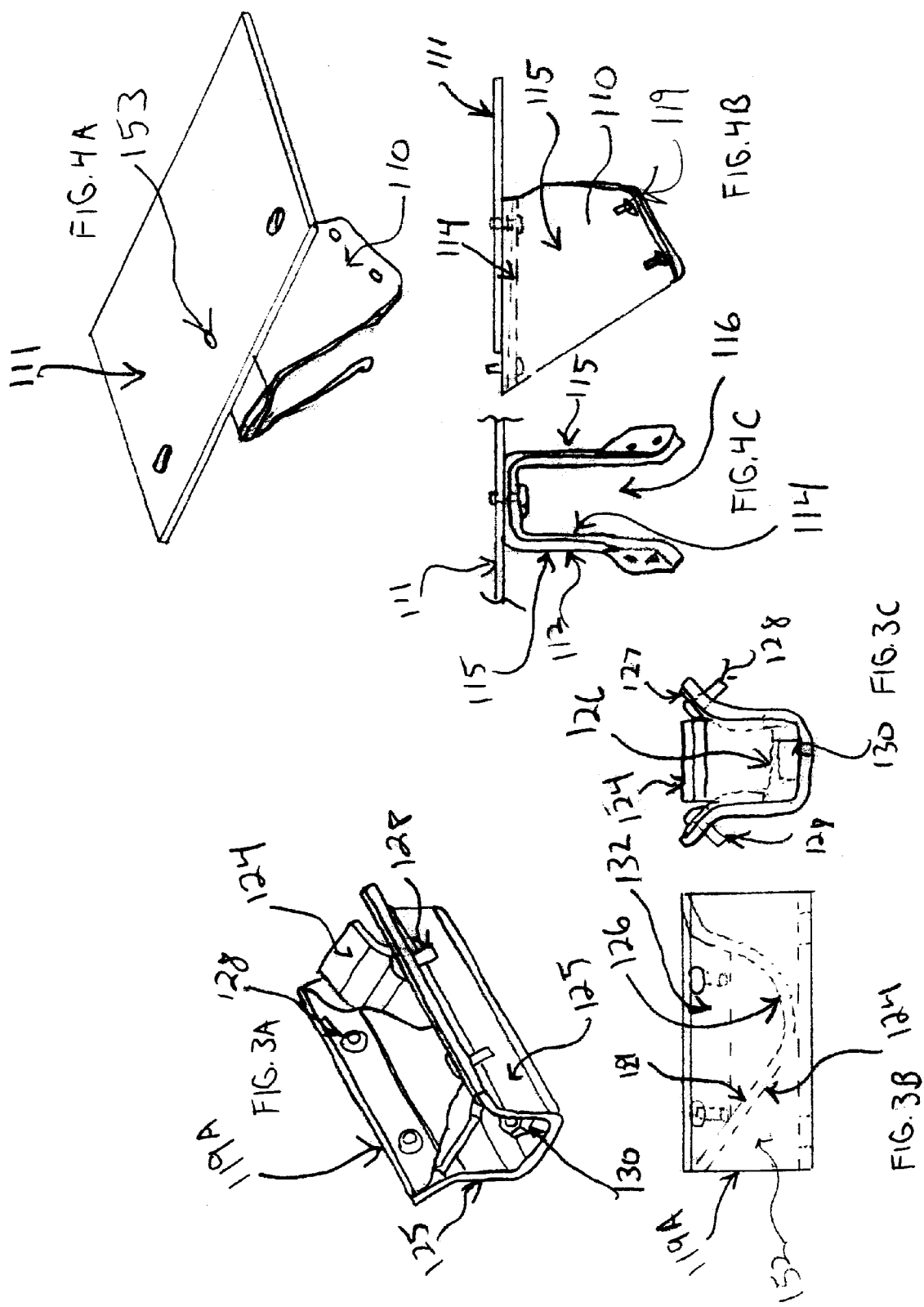

HOOD MOUNTING SYSTEM FOR MOBILE VEHICLE

BACKGROUND

This invention relates to hood mounting systems for mobile vehicles such as medium-duty, and heavy-duty trucks, and buses. More specifically, the invention involves the insertion of a urethane or rubber liner into the receiving brackets of a forward tilting hood mounting system to remove noise such as knocks, rattles, and squeaks usually associated with hood mounting points.

PRIOR ART

Owners of mobile vehicles such as medium-duty, and heavy-duty trucks and buses sometimes complain about road noises associated with hood mounting points. The hoods on these type vehicles are generally forward tilting with a rotational connection to a forward portion of the chassis of the vehicle. The rearward engagement points between the hood and the cab or chassis of the vehicle generate road noises such as knocks, rattles, and squeaks. This may be due to relative movement between the hood and the rest of the vehicle during vehicle movement. Tolerance maintenance between the prior art hood mounting components and the vehicle mounting components and the relative hardness at the mounting component interface contribute to this noise generation. What has not been previously suggested is having a hood mounting system in which mounting brackets are lined with urethane or rubber in either a sheet or molded form to act as the interface between hood mounting components and vehicle mounting components.

SUMMARY

The hood mounting system of this invention and a mobile vehicle with this system installed satisfy the primary objective of this invention as follows. The hood mounting system includes two lower hood brackets and one upper cowl guide mounted to the cowl or forward portion of the cab of the vehicle. The hood of the mounting system includes a rear support frame that has a center hood guide bracket for engagement to the upper cowl guide upon hood closing. The hood rear support frame also has two hood rear support guides, one each vertical side of the support frame. Each hood rear support guide mates with a lower hood bracket upon hood closing. The lower hood brackets each contain a liner insert that may be made from a rubber or urethane sheet or molded from this material. This liner insert acts as the component interface. Conventional lower hood brackets may be transformed into this component by insertion of a urethane or rubber liner sheet formed to fit the insertion receptacle. The center guide bracket of the hood also has a urethane or rubber liner insert located within its fold receptacle. The guide components may each have urethane insert pad for mating with the urethane or rubber liner of the associated mating components. The insert-pad-to-liner of the associated components provide increased noise reduction and manufacturing play in regards to mating tolerances.

DRAWINGS

Other objects and advantages of the invention will become more apparent upon perusal of the detailed description thereof and upon inspection of the drawings, in which:

FIG. 2 is a partial cutaway view of the vehicle and hood support system of FIG. 1 and made in accordance with this invention.

FIG. 3A is a perspective view of the lower hood bracket of the cab cowl of the vehicle of FIG. 2.

FIG. 3B is a side view of the lower hood bracket of FIG. 3A.

FIG. 3C is an end on view of the lower hood bracket of FIG. 3A.

FIG. 4A is a perspective view of the center hood guide bracket of the hood of the vehicle of FIG. 2.

FIG. 4B is a side view of the center hood guide bracket of FIG. 3A.

FIG. 4C is an end on view of the center hood guide bracket of FIG. 3A.

DETAILS OF INVENTION

Figure 1:
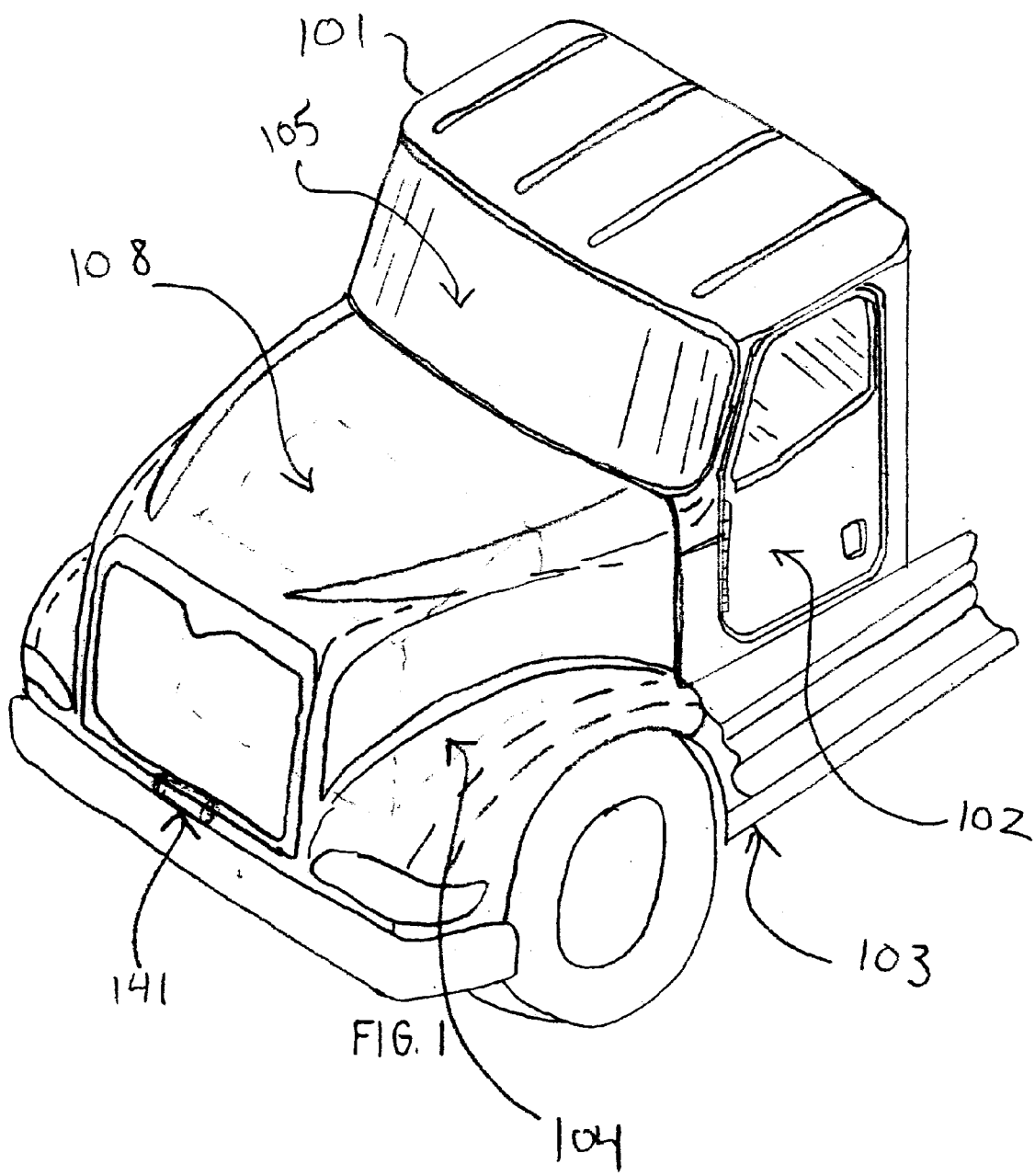
FIG. 1 is a mobile vehicle with forward tilting hood of the type for a hood support system made in accordance with this invention.

The hood support system for a hood 104 of this invention may be installed on any mobile vehicle 101 with a forward tilting engine compartment hood such as a medium-duty or heavy-duty truck or a commercial or school bus vehicle 101. FIGS. 1 and 2 show such hood support system for a hood 104 installed on a vehicle 101. The hood 104 being primarily for enclosing and shielding an engine 108 for propulsion of the vehicle 101. The engine 108 is engaged to the chassis 103 of the vehicle 101 and must be accessed for pre-operational and periodic checks through an open hood 104. The vehicle 101 has a driver and passenger cab 102 engaged to a chassis 103. There is a forward tilting hood 104 that is engaged to the chassis 103 through a hinge or pivoting mechanism 141. The cab 102 cowl or lower forward portion 107, above which the windshield 105 is engaged to the cab 102. The hood 104 of the mounting system includes a rear support frame 106 that is engaged to a rear underside of the hood 104. The rear support frame 106 also may provide a mounting location for some of the components comprising the hood mounting system of this invention.

The hood mounting system includes two lower hood brackets 119A and 119B and one upper cowl guide 122 mounted to the cowl or lower forward portion 107 of the cab 102 of the vehicle 101. The lower hood brackets 119A and 119B may be mounted directly to the cowl 107 or indirectly. The indirect mounting of the lower hood brackets 119A and 119B may be through lower hood cowl support brackets 121A and 121B that sandwich support plates 120A and 120B between the lower hood brackets 119A and 119B and the lower hood cowl support brackets 121A and 121B. These components would be held in the sandwich with a fastener set 130. See FIGS. 3A and 3B. The upper cowl guide 122 includes a urethane or rubber insert pad 123.

The rear support frame 106 of the hood 104 has a center hood guide bracket 110 for engagement to the upper cowl guide 122 upon hood 104 closing. The center hood guide bracket 110 may be engaged directly to the rear support frame 106 or indirectly through a frame support plate 111. Where the frame support plate 111 is used the center hood guide bracket 110 is engaged to the rear support frame 106 through a fastener 153. There are also two hood rear support guides 112A and 112B engaged to each vertical side of the hood rear support frame 106. The hood rear support guides 112A and 112B each have a urethane or rubber insert pad 113. Each hood rear support guide 112A and 112B mates with a lower hood bracket 119A and 119B upon hood 104 closing.

The lower hood brackets 119A and 119B each contain a liner insert 124 that may be made from a rubber or urethane sheet or molded from this material. See FIGS. 3A to 3C. This liner insert 124 acts as the component interface for noise reduction. In a preferred embodiment, the liner insert 124 has two outer walls 127 engaged to upper flared sides 125 of the lower hood brackets 119A and 119B through fasteners 128. The outer walls 127 of the liner insert 124 lead into a center portion 126. In a rear to aft direction the liner insert 124 has a rearward sloping section 129 leading into the center portion 126. In this preferred embodiment the combination of the rearward sloping section 129 and center section 126 and outer walls 127 provide an efficient noise reducing factor as well as gripping shape for the hood rear support guides 112A and 112B engagement surfaces. Conventional lower hood brackets 119A and 119B may be transformed into this component by insertion of a urethane or rubber liner sheet 124 formed to fit a insertion receptacle 152.

The center guide bracket 110 of the hood 104 also has a urethane or rubber liner insert 114 located within its fold receptacle 116. See FIGS. 4A to 4C. In the preferred embodiment the liner insert 114 is engaged to the lower flared sides 112 and 115 of the center guide bracket 110 through fasteners 119.

The guide components 122 and 112A and 112B may each have urethane insert pad 123 and 113 respectively for mating with the urethane or rubber liners 124 and 114 of the associated mating components. The insert-pad-to-liner of the associated components provide increased noise reduction and manufacturing play in regards to mating tolerances. This is achieved with the urethane to rubber or rubber-to-rubber fit up of the mating components on the hood 104 and cab 107 respectively. These components grip each other better than metal-to-metal fits hence reducing noise, knocks, and rattles and squeaks. This invention can be installed in any type vehicle 101 with a forward tilting hood 104.

As described above, the hood support system for a hood 104, and the vehicle 101 with this system installed provide a number of advantages, some of which have been described above and others of which are inherent in the invention. Also modifications may be proposed to the hood support system for a hood 104, and the vehicle 101 with this system with these components installed without departing from the teachings herein.

I claim:

1. A hood support system and vehicle in combination, comprising:
   a chassis;
   a cab engaged to said chassis, said cab having a cowl;
   a forward tilting engine compartment hood for enclosing an engine of said vehicle, said engine being engaged to said chassis;
   said hood engaged to said chassis through a forward pivoting mechanism;
   said hood having an inner rear support frame engaged to a rear underside of said hood;
   two lower hood brackets and one upper cowl guide engaged to said cowl;
   said upper cowl guide being engaged to an upper side of a said cowl;
   said upper cowl guide including a soft insert pad;
   said lower hood brackets being engaged to lower outer portions of said cowl;
   said lower hood brackets containing a liner insert sheet made of a soft material, said lower hood bracket liner insert sheet acting as a noise reduction interface;
   said rear support frame of said hood having a center hood guide bracket for engagement to said upper cowl guide upon hood closing;
   two hood rear support guides engaged to each vertical inner side of said hood rear support frame;
   said hood rear support guides each having a soft insert pad;
   said center hood guide bracket having a liner insert sheet made of a soft material, said center hood guide bracket liner insert sheet acting as a noise reduction interface; and
   each said hood rear support guide mating with a lower hood bracket upon hood closing.

2. The hood support system and vehicle combination of claim 1, wherein:
   said soft insert pads of said guides being made of urethane; and
   said liner inserts of said brackets being made of urethane.

3. The hood support system and vehicle combination of claim 1, wherein:
   said soft insert pads of said guides being made of rubber; and
   said liner inserts of said brackets being made of rubber.

4. The hood support system and vehicle combination of claim 2, wherein:
   said liner insert of said lower hood bracket having two outer walls engaged to upper flared sides of said lower hood brackets;
   said outer walls of the liner insert of said lower hood bracket leading into a center portion; and
   said liner insert of said lower hood bracket having a rearward sloping section leading into said center portion.

5. The hood support system and vehicle combination of claim 3, wherein:
   said liner insert of said lower hood bracket having two outer walls engaged to upper flared sides of said lower hood brackets;
   said outer walls of the liner insert of said lower hood bracket leading into a center portion; and
   said liner insert of said lower hood bracket having a rearward sloping section leading into said center portion.

6. The hood support system and vehicle combination of claim 4, wherein:
   said liner insert of said center guide bracket being engaged to lower flared sides of said center guide bracket.

7. The hood support system and vehicle combination of claim 5, wherein:
   said liner insert of said center guide bracket being engaged to lower flared sides of said center guide bracket.

8. A hood and support system for a mobile vehicle, the vehicle having a chassis and cab engaged to the chassis, the cab having a cowl, and an engine engaged to the chassis, comprising:
   a forward tilting engine compartment hood for enclosing the engine;
   said hood engageable to the chassis through a forward pivoting mechanism;
   said hood having an inner rear support frame engaged to a rear underside of said hood;
   two lower hood brackets and one upper cowl guide engageable to said cowl;

said upper cowl guide being engageable to an upper side of a said cowl;

said upper cowl guide including a soft insert pad;

said lower hood brackets containing a liner insert sheet made of a soft material, said lower hood bracket liner insert sheet acting as a noise reduction interface;

said rear support frame of said hood having a center hood guide bracket for engagement to said upper cowl guide upon hood closing;

two hood rear support guides engaged to each vertical inner side of said hood rear support frame;

said hood rear support guides each having a soft insert pad;

said center hood guide bracket having a liner insert sheet made of a soft material, said center hood guide bracket liner insert sheet acting as a noise reduction interface; and each said hood rear support guide mating with a lower hood bracket upon hood closing.

9. The hood and support system of claim 8, wherein:

said soft insert pads of said guides being made of urethane; and said liner inserts of said brackets being made of urethane.

10. The hood and support system of claim 8, wherein:

said soft insert pads of said guides being made of rubber; and said liner inserts of said brackets being made of rubber.

11. The hood and support system of claim 9, wherein:

said liner insert of said lower hood bracket having two outer walls engaged to upper flared sides of said lower hood brackets;

said outer walls of the liner insert of said lower hood bracket leading into a center portion; and said liner insert of said lower hood bracket having a rearward sloping section leading into said center portion.

12. The hood and support system of claim 10, wherein:

said liner insert of said lower hood bracket having two outer walls engaged to upper flared sides of said lower hood brackets;

said outer walls of the liner insert of said lower hood bracket leading into a center portion; and said liner insert of said lower hood bracket having a rearward sloping section leading into said center portion.

13. The hood and support system of claim 11, wherein:

said liner insert of said center guide bracket being engaged to lower flared sides of said center guide bracket.

14. The hood and support system of claim 12, Werein:

said liner insert of said center guide bracket being engaged to lower flared sides of said center guide bracket.

15. A hood support system and vehicle in combination, comprising:

a chassis;

a cab engaged to said chassis, said cab having a cowl;

a forward tilting engine compartment hood for enclosing an engine of said vehicle, said engine being engaged to said chassis;

said hood engaged to said chassis through a forward pivoting mechanism;

said hood having an inner rear support frame engaged to a rear underside of said hood;

two lower hood brackets and one upper cowl guide engaged to said cowl;

said upper cowl guide being engaged to an upper side of a said cowl;

said lower hood brackets being engaged to lower outer portions of said cowl;

said rear support frame of said hood having a center hood guide bracket for engagement to said upper cowl guide upon hood closing;

two hood rear support guides engaged to each vertical inner side of said hood rear support frame;

each said hood rear support guide mating with a lower hood bracket upon hood closing; and wherein a urethane sheet is provided at hood closing interfaces between said hood and cowl components for providing noise reduction at said interfaces.

\* \* \* \* \*